United States Patent [19]

Tamaki et al.

[11] Patent Number: 5,418,083

[45] Date of Patent: May 23, 1995

[54] BATTERY WITH RUST PREVENTIVE STRUCTURE

[75] Inventors: Kenji Tamaki, Hiki; Hiroyuki Suzuki, Minamisaitama; Masayuki Toriyama, Kawagoe; Yoshihiro Nakazawa; Masaharu Nakamori, both of Asaka; Tsukasa Ito, Sumoto; Fumiki Takesue, Sumoto; Akihiro Furuse, Sumoto; Kazuhiro Kitaoka, Sumoto, all of Japan

[73] Assignee: Honda Giken Kogyo Kabushiki Kaisha, Tokyo, Japan

[21] Appl. No.: 170,746

[22] Filed: Dec. 21, 1993

[30] Foreign Application Priority Data

Dec. 22, 1992 [JP] Japan .............................. 4-087943 U
Sep. 16, 1993 [JP] Japan .............................. 5-050332 U
Oct. 29, 1993 [JP] Japan .................................. 5-272231

[51] Int. Cl.⁶ ........................................... H01M 2/12
[52] U.S. Cl. ...................................... 429/53; 429/167; 429/174
[58] Field of Search ............... 429/65, 159, 160, 161, 429/167, 170, 171, 173, 174, 180, 181, 53–56, 72, 185

[56] References Cited

U.S. PATENT DOCUMENTS

| | | |
|---|---|---|
| 2,355,197 | 8/1944 | Anthony et al. |
| 2,416,079 | 2/1947 | Anthony. |
| 3,473,964 | 10/1969 | Leftault, Jr. ............................ 429/65 |
| 3,753,781 | 8/1973 | Parker et al. ...................... 429/65 X |
| 3,825,447 | 7/1974 | Kraals ..................................... 429/65 |
| 3,861,906 | 1/1975 | Parker et al. ........................... 429/65 |
| 5,026,616 | 6/1991 | Schumm, Jr. ................... 429/170 X |
| 5,079,108 | 1/1992 | Annen et al. ....................... 429/171 |

FOREIGN PATENT DOCUMENTS

| | | |
|---|---|---|
| 0539269 | 4/1993 | European Pat. Off. . |
| 2168886 | 9/1973 | France . |
| 3518216 | 11/1986 | Germany . |
| 59-19301 | 6/1984 | Japan . |
| 61-34856 | 2/1986 | Japan . |
| 62-59961 | 4/1987 | Japan . |
| 2-139849 | 5/1990 | Japan . |
| 2027978 | 2/1980 | United Kingdom . |
| 2034511 | 6/1980 | United Kingdom . |
| 2136629 | 9/1984 | United Kingdom . |

OTHER PUBLICATIONS

Patent Abstracts of Japan, vol. 8, No. 277 (E–285)(1714) Dec. 18, 1984.

*Primary Examiner*—Anthony Skapars
*Attorney, Agent, or Firm*—Wenderoth, Lind & Ponack

[57] ABSTRACT

A battery having a rust-preventive structure includes a battery cell, the side-wall and an outer peripheral region of the safety valve end of which are covered with heat-shrink tubing. A sealing plate is attached in a moisture-tight fashion to the heat-shrink tubing on the safety valve end via a pressure separating adhesive layer. Adhesive seals the region between a lead-tab connected to the battery terminal and the sealing plate.

18 Claims, 11 Drawing Sheets

BATTERY WITH RUST PREVENTIVE STRUCTURE

BACKGROUND OF THE INVENTION

This invention relates to batteries with rust-preventive structures primarily incorporated in electric-powered vehicles or in equipment used where moisture is likely to accumulate on the batteries.

A single battery cell typically has an iron case with a nickel-plated surface. When moisture adheres to the surface of the metal case, the nickel plating peels off exposing the iron such that the iron may rust. Battery rusting causes poor electrical contact by increasing contact resistance, and also impedes proper operation of the safety valve. To alleviate these problems, battery packs used outdoors have a plurality of battery cells sealed within a moisture-tight case.

Because the battery cells are protected in the moisture-tight case, they can be used outdoors with confidence. However, only small capacity batteries can be employed in this structure. This is because the battery cells cannot be effectively air-cooled for applications where high currents are extracted. Since battery packs used as power supplies for applications such as electric-powered vehicles output high currents and correspondingly large amount of heat, how efficiently that heat can be given off is extremely important. When a battery heats up and its temperature rises, battery performance drops drastically. High current batteries used for applications such as electric-powered vehicles have large battery capacities. In order to reduce the charging time of high capacity batteries, charging currents are increased and effective air-cooling during charging is also important. Consequently, high current batteries, even those used outdoors, cannot be waterproofed by configuring a plurality of battery cells inside a moisture-tight case. Therefore, prior art high current batteries have the drawback that effective cooling as well as a waterproof structure are difficult to achieve.

A safety valve is provided to prevent a battery's external case from bursting. The safety valve opens when internal pressure rises abnormally. An open safety valve prevents external case rupture by exhausting gases within the battery. Provision of a safety valve makes it difficult to attain a moisture-tight seal for the battery. As discussed in Japanese Utility Model Publication No. 59-19301 issued Jun. 4, 1984 and Japanese Non-examined Utility Model Publication No. 62-59961 issued Apr. 14, 1987, this is because battery gases cannot be quickly discharged out of an opened safety valve.

SUMMARY OF THE INVENTION

This invention was developed for the purpose of correcting these and other drawbacks. It is thus a primary object of this invention to provide a battery with a rust-preventive structure which can be effectively air-cooled and which has a moisture-resistant configuration without offering an impediment to the safety valve operation.

To achieve this object, the battery of the present invention includes a battery cell the outer sidewall of which is covered with heat-shrink tubing. The heat-shrink tubing that covers the sidewall also covers the outer peripheral portion of a battery terminal end provided with a safety valve. The heat-shrink tubing is longer than the total battery cell length so that it extends beyond the terminal ends. The portion of the tubing that extends beyond a terminal end is shrunk to form a ring covering the outer periphery of the terminal end. This portion of the heat-shrink tubing extending around the outer periphery of the safety valve terminal end is attached in a moisture-tight fashion to a sealing plate via a pressure separating adhesive layer. The sealing plate has an opening open to the battery terminal. The pressure separating adhesive layer allows the sealing plate to separate from the tubing when the battery cell safety valve opens and gas pressure is exerted against the sealing plate. When the separation occurs, an opening is created for gas to escape between the sealing plate and the heat-shrink tubing. A terminal lead-tab extends through the battery terminal opening in the sealing plate, and the end of the lead-tab connects with the terminal at the safety valve end of the battery. The area between the lead-tab and the sealing plate is filled with adhesive to prevent the ingress of moisture. The region of the battery terminal end opposite the safety valve end is also covered in a moisture-tight fashion. Since this terminal end has no safety valve, it can be made moisture-tight by applying adhesive between a sealing plate and the heat-shrink tubing. However, this sealing plate is attached to the heat-shrink tubing without a pressure separating adhesive layer but rather with an adhesive that does not fail even when pressure is applied to the sealing plate.

BRIEF DESCRIPTION OF THE DRAWINGS

FIG. 4 is a cross-sectional view of a battery cell with a safety valve built-in.

DETAILED DESCRIPTION OF THE INVENTION

Figure 4:
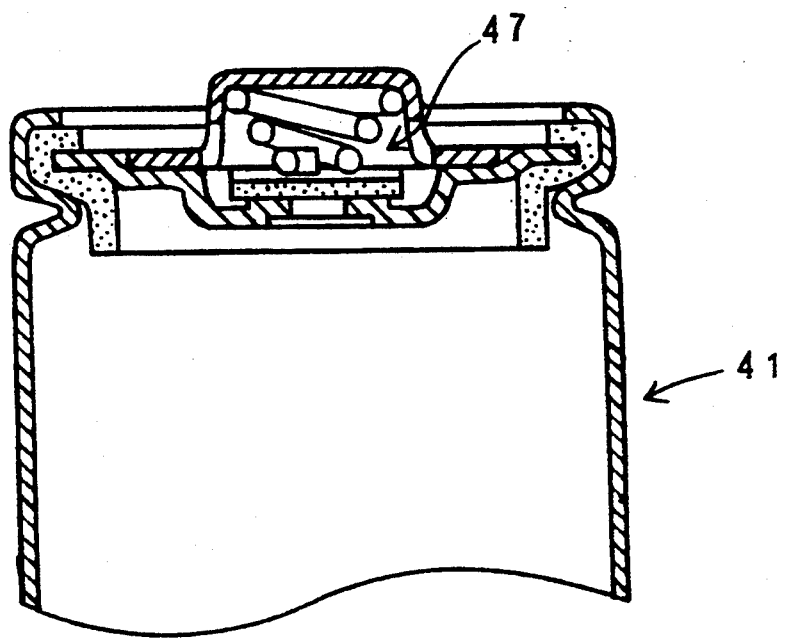

The outer sidewall 1A of the battery cell 1 of the battery is covered with heat-shrink tubing 2. The battery cell is shown in the figures as cylindrical. However, the present invention is not limited to a battery cell having the shape of a right cylinder. For example, the battery cell may also have the shape of a rectangular column or an elliptical column. As shown in FIG. 4, the battery cell has a built-in safety valve 47. The safety valve 47 opens when gas pressure within the battery rises abnormally. The safety valve 47 shown in FIG. 4 is built-in to the +terminal end of the battery cell 41.

Figure 1:
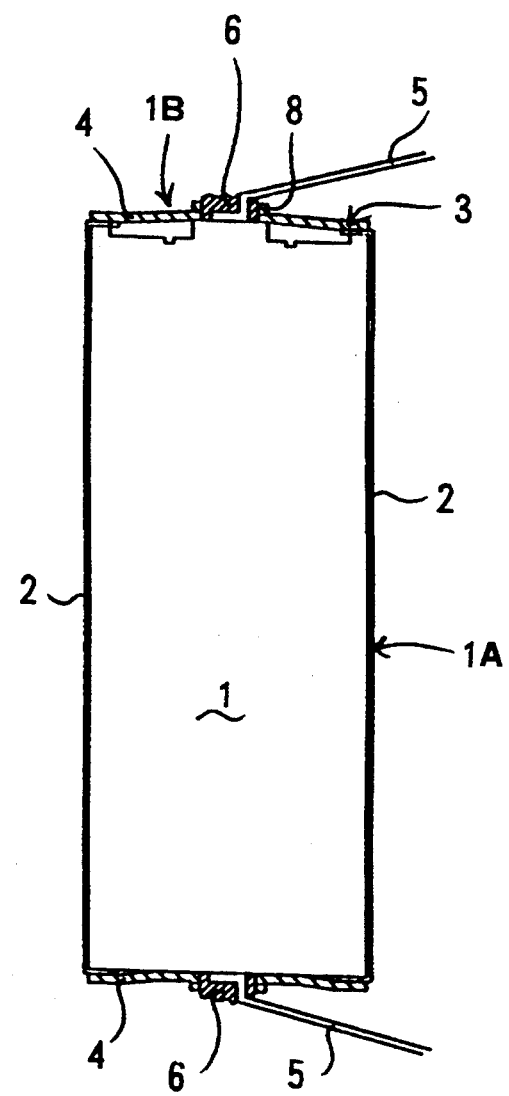
FIG. 1 is a cross-sectional view of one embodiment of a battery having a rust-preventive structure according to the present invention.
Figure 2:
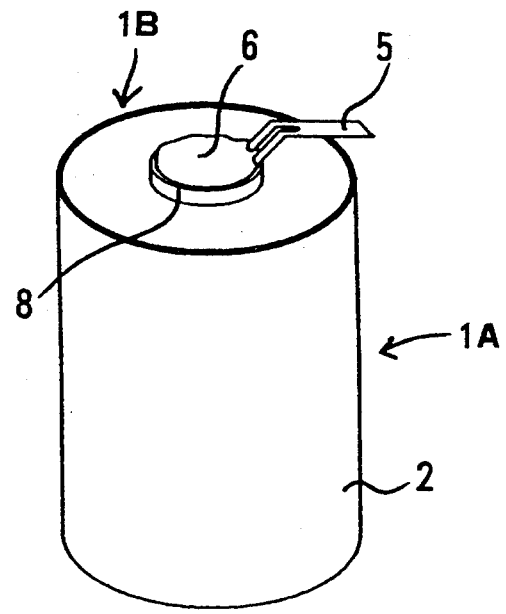
FIG. 2 is a perspective view of the battery shown in FIG. 1.
Figure 3:
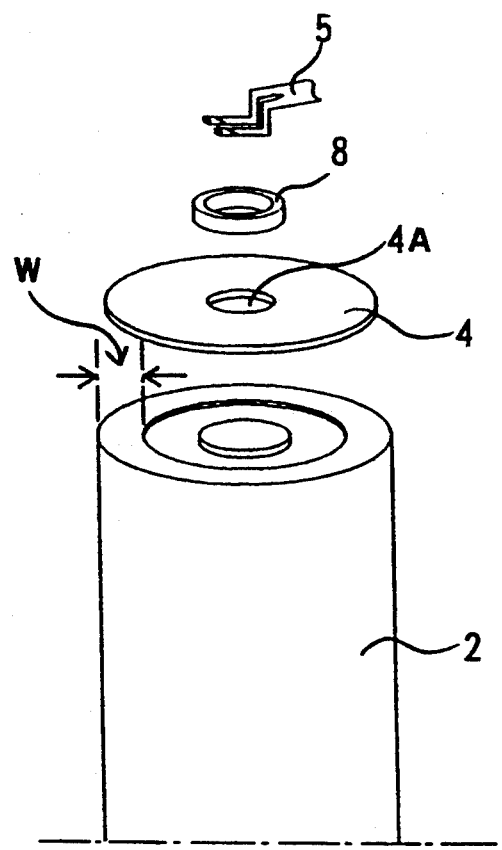
FIG. 3 is an exploded perspective view of the +terminal region of the battery shown in FIG. 1.

The heat-shrink tubing 2 covering the outer sidewall 1A of the battery cell 1 shown in FIGS. 1 through 3 is a synthetic resin film that shrinks when heated. In its un-shrunken state, the heat-shrink tubing 2 has a cylindrical shape larger than that of the battery cell 1. The battery cell 1 is inserted into the cylindrical heat-shrink tubing 2, and the tubing is heated and shrunk to adhere tightly to the outer sidewall 1A of the battery cell 1. As shown in FIGS. 1 and 3, the heat-shrink tubing 2 covers not only the battery cell sidewall 1A but also the outer peripheral region of the battery terminal end 1B. The width (W) of the heat-shrink tubing 2 covering the outer peripheral region of the terminal end 1B is between 2mm and 20mm and preferably between 3mm and 10mm in order to facilitate the attachment of a sealing plate 4. The width (W) of the heat-shrink tubing 2 covering the outer peripheral region of the end 1B can be set by selecting an appropriate overall length of the heat-shrink tubing 2. The width (W) of heat-shrink tubing 2 covering the end 1B is widened with increases in the overall length of the heat-shrink tubing 2. Since the heat-shrink tubing 2 shrinks when heated, it adheres tightly to the outer peripheral region of the terminal end 1B as shown in FIG. 3. The heat-shrink tubing 2 bends through a 90° angle between the battery cell sidewall 1A and the terminal end 1B tightly adhering to the surface of the battery cell 1.

The battery has a sealing plate 4 attached to the outer peripheral region of the battery terminal end 1B. The sealing plate 4 is made from insulating sheet material that moisture does not penetrate such as plastic. The sealing plate 4 has essentially the same shape as that of the battery cell terminal end 1B in order to close it off. A battery terminal hole 4A is provided at the center of the sealing plate 4 to allow a lead-tab 5 to pass therethrough. A ring 8 is attached in a moisture-tight fashion to the sealing plate 4 at the terminal hole 4A. The ring 8 prevents leakage of adhesive 6 applied in the vacancy at the terminal hole 4A with the lead-tab 5 inserted. In other words, the sealing plate 4 with the ring 8 establishes a reliable moisture-tight seal between the lead-tab 5 and the sealing plate 4 with a small amount of adhesive 6. This also gives the battery terminal 1B a good finished appearance. The sealing plate 4 is attached to the surface of the heat-shrink tubing 2 covering the outer peripheral region of the terminal end 1B via a pressure separating adhesive layer 3.

The pressure separating adhesive layer 3 allows at least a portion of the sealing plate 4 to separate from the heat-shrink tubing 2 when the battery cell's safety valve opens. The safety valve built-in to a nickel-cadmium battery is designed to open when internal pressure rises to about 20Kg/cm². Consequently, the pressure separating adhesive layer 3 has a design strength that will cause the sealing plate 4 to separate therefrom when the sealing plate 4 is pushed by gas discharged from the battery case through the open safety valve. For example, double-sided adhesive tape can be used as the pressure separating adhesive layer 3. The sealing plate 4 can be easily attached to the heat-shrink tubing 2 when double-sided tape is used. Adhesive can also be used for the pressure separating adhesive layer instead of double-sided tape. To attach the sealing plate to the heat-shrink tubing, adhesive can be applied to either the surface of the sealing late or the heat-shrink tubing or to both. Further, instead of adhesive, the pressure separating adhesive layer can be of any type of bonding means that allows separating of the sealing plate from the heat-shrink tubing when the sealing plate is pushed on by gas pressure.

When the safety valve opens, the pressure separating adhesive layer 3 causes the sealing plate 4 to separate from the heat-shrink tubing 2. Consequently, it is necessary for the sealing plate 4 at the safety valve terminal end 1B to be attached to the heat-shrink tubing 2 via a pressure separating adhesive layer 3. The reason for this is because gas which passes through the safety valve into the battery terminal must be exhausted between the sealing plate 4 and the heat-shrink tubing 2.

After the sealing plate 4 is attached to the heat-shrink tubing 2 on the terminal end 1B, the lead-tab 5 is spot welded to the terminal of the battery cell 1. The end of the lead-tab 5 passes through the sealing plate 4 and connects with the terminal of the battery cell 1. The lead-tab 5 is made of sheet metal and is bent as shown in FIG. 3 for easy passage through the ring 8 of the sealing plate 4.

After the lead-tab 5 is connected to the battery terminal, the vacancy between the lead-tab 5 and the terminal hole 4A is plugged with the adhesive 6. Adhesive is applied within the ring 8 to effect a moisture-tight seal between the lead-tab 5 and the sealing plate 4. Adhesives such as those in the epoxy, urethane, phenol, and acrylic families can be used as the adhesive 6.

The battery shown in FIG. 1 has both the + and − terminals sealed against moisture by the same structure. Although it is necessary to attach the sealing plate 4 to the heat-shrink tubing 2 via the pressure separating adhesive layer 3 to allow gas to be exhausted between the sealing plate 4 and the heat-shrink tubing 2, the battery terminal end without the built-in safety valve (normally the - terminal end) can have an intrinsically moisture-tight structure. In other words, at this terminal end there is no demand for the ability to release gas that builds up pressure within the battery. Consequently, the sealing plate 4 at this terminal end can be attached to the heat-shrink tubing via a robust adhesive that does not separate due to internal gas pressure. Further, although not illustrated, the area of this terminal end can be nearly entirely covered by the heat-shrink tubing and the gap between the lead-tab and the heat-shrink tubing can be sealed against moisture by adhesive without using a sealing plate.

A high capacity battery to which this type of moisture-tight sealing is applied is seldom used as a single unit. More often a plurality of battery cells are used as a battery pack by connecting them in series to establish the proper output voltage or in parallel to further increase the battery capacity. By connecting a plurality of batteries together in this fashion, the battery pack can be made to have a capacity and voltage optimally suited for applications such as a power source for electric-powered vehicles.

When this is done, it is important to connect the battery cells together in a configuration that allows effective cooling. In particular, the total quantity of heat generated by a battery pack with many high capacity battery cells is large, and effective cooling to prevent an excessive temperature rise is extremely important. It is also important to make the battery pack compact enough to fit within a limited space. Compactness and effective heat dissipation are mutually exclusive characteristics that are very difficult to realize simultaneously. When a battery pack is assembled in a compact fashion, heat dissipation is difficult, battery temperature rises, and reduction in battery performance due to such a temperature rise becomes a problem.

Figure 5:
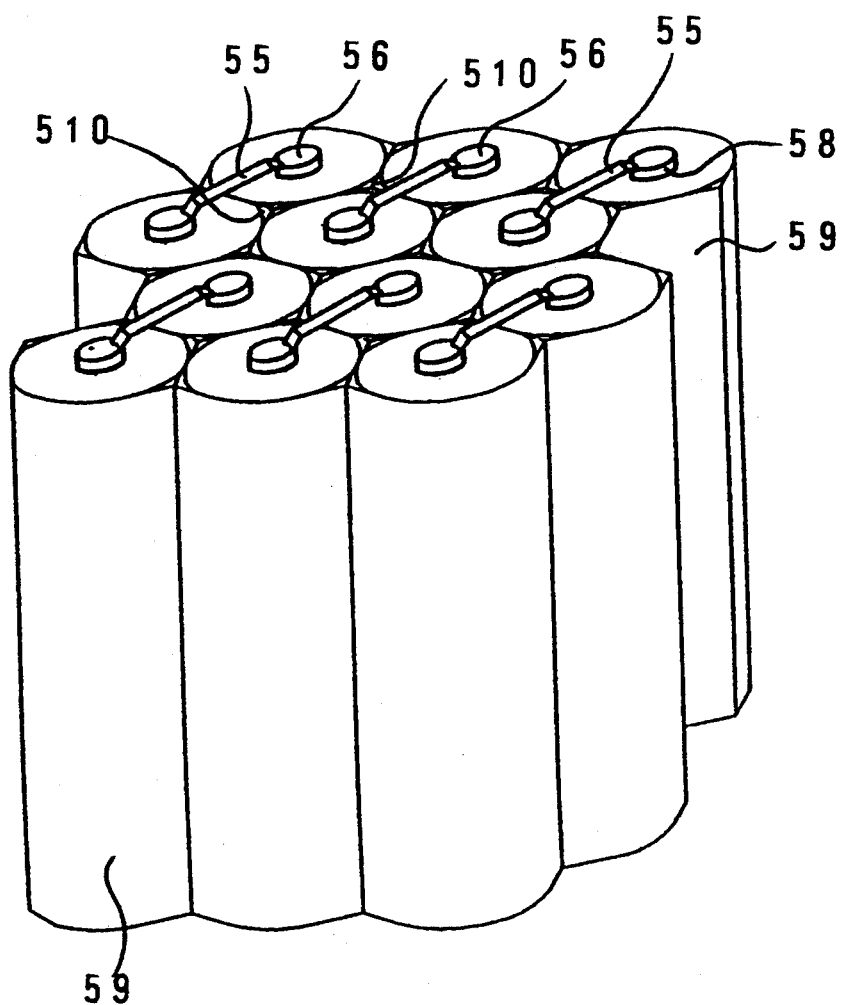
FIG. 5 is a perspective view of a battery pack with a plurality of batteries connected together.
Figure 6:
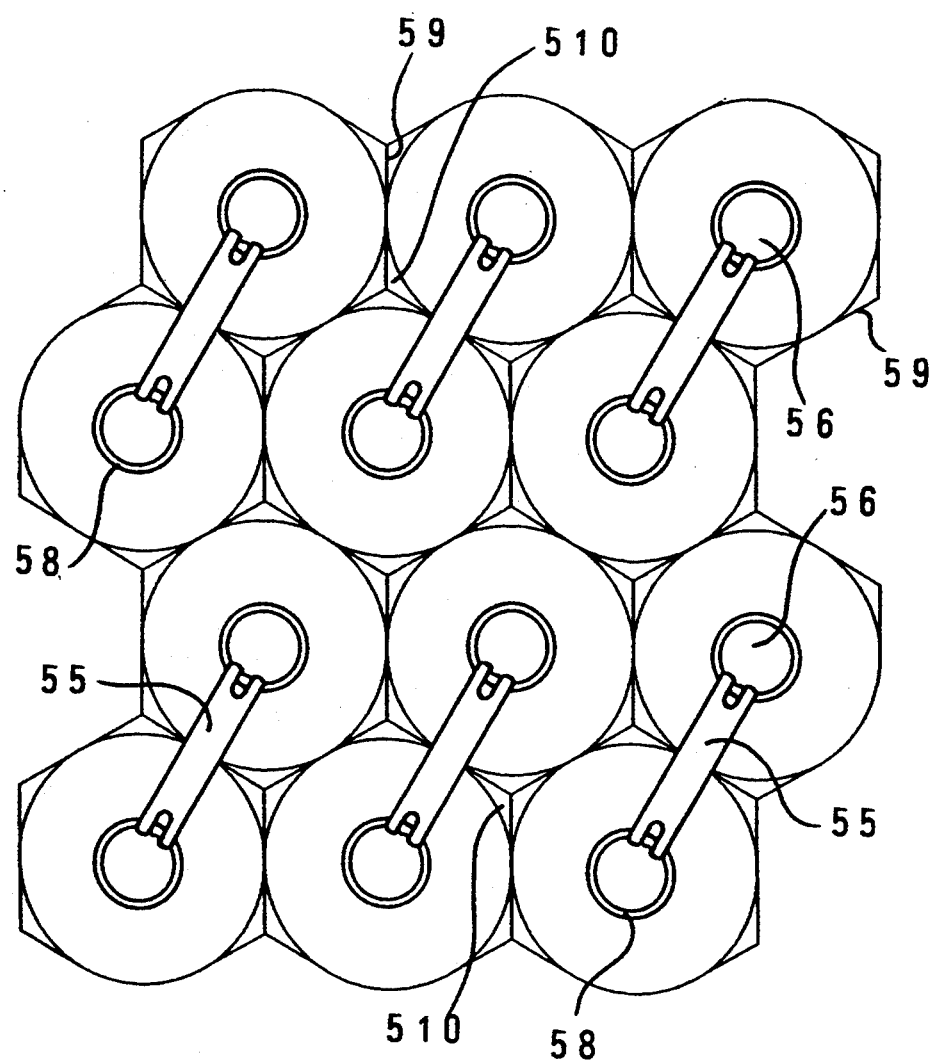
FIG. 6 is a plan view of the battery pack shown in FIG. 5.

FIGS. 5 and 6 show an improved battery pack that can effectively dissipate heat and has an overall compact shape. This battery pack connects batteries together using a honeycomb core 59 that creates air cooling ducts 510 between each set of adjacent batteries. Both ends of the honeycomb core 59 are open to allow air to flow freely through the air cooling ducts 510 of the battery pack. Batteries with the above-described rust-preventive structure are inserted into the hexagonal cylinders of the honeycomb core 59 forming air cooling ducts 510 between adjacent batteries.

Sheet material with the flexibility to deform and some resiliency is used for the honeycomb core 59. The honeycomb core 59 is sized to cause some outward expansion of the cylinders when the batteries are inserted. As shown in FIG. 6, when batteries are inserted into the honeycomb core's hexagonal cylinders, air cooling ducts 510 of identical shape are created between each set of adjacent batteries.

The air cooling ducts 510 pass vertically through the battery pack allowing air to pass freely therethrough. Consequently, cooling air easily flows through the air cooling ducts 510 to effectively and uniformly cool the surface of each battery. In particular, the honeycomb core 59 does not attach to the entirety of the battery surfaces and uniform forced cooling of those battery surfaces is accomplished by air flowing through the air cooling ducts 510. Since the honeycomb core 59 does not cover the battery surfaces, battery surfaces exposed to the air cooling ducts 510 are in direct contact with the air and are cooled without intervention by the honeycomb core 59. The cooling ducts 510 are of course provided at the innermost part of the battery pack. The temperature can easily rise at the innermost part of the battery pack since it is difficult to dissipate heat there. Except for the portion of each battery that abuts the batteries adjacent thereto through the core 59, a relatively large battery surface area is exposed within the air cooling ducts 510. Consequently, a battery pack employing the honeycomb core has the advantage that many batteries can be cooled very effectively by passing cooling air through the ducts 510. Further, since the honeycomb core 59 can neatly arrange the batteries in fixed positions, a compact overall shape can be obtained.

Figure 7:
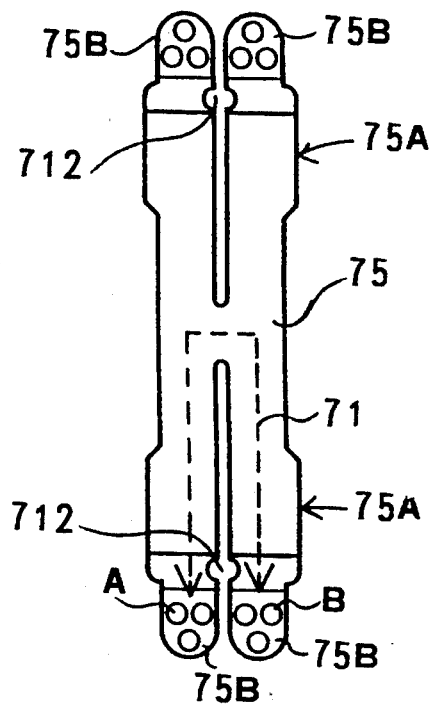
FIG. 7 is a plan view of an alternative lead-tab configuration.

The lead-tab that connects battery cell terminals together can also have the shape shown in FIG. 7. Both ends of the lead-tab 75 shown in this figure are bifurcated, i.e. divided in two. As shown in the side view of FIG. 8, the divided part of the lead-tab 75A is passed through the hole in the battery terminal sealing plate and welded to the battery terminal as facilitated by the end of the lead-tab 75 bent at an obtuse angle ($\alpha$) to form a welding region 75B. As can be seen, the ends of the lead-tab 75 are each bent at obtuse angles at two points and the center portion of the lead-tab 75 is linear. However, although not illustrated, it is not necessary to bend each end of the lead-tab in two places next to the welding region 75B. For example, it is also possible to bend each tab once at each end at an obtuse angle to form the welding region 75B, and to then bend the remainder of the lead-tab into a slightly curved arch. The welding region 75B provided by bending each end of the lead-tab 75 is spot welded to a +or −terminal of a battery.

A lead-tab 75 with bifurcated ends can be efficiently spot-welded. This is because when points A and B shown in FIG. 7 touch the terminal during spot welding, parasitic current I flowing through the circuit shown by a broken line is reduced and a large current can flow between the welding region 75B and the battery cell terminal.

Figure 9:
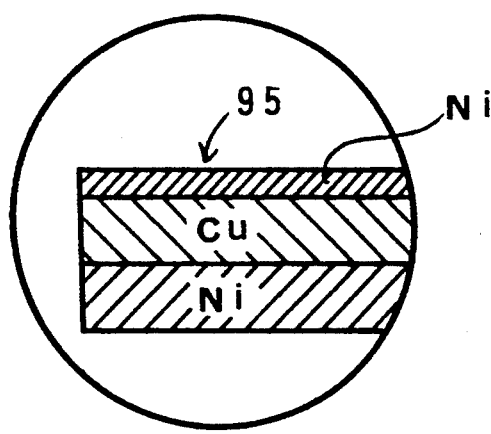
FIG. 9 is an enlarged cross-sectional view of the lead-tab.

Further, clad material that is a laminate of different metals can be used for the lead-tab 75 to reduce parasitic currents during spot welding. The clad material is copper with a metal of lower conductivity plated over the surface of the copper. FIG. 9 shows an enlarged cross-sectional view of an optimum clad material for the lead-tab 95. The clad material in this figure has layers of nickel as the lower conductivity metal laminated on both surfaces of copper. Nickel and copper are joined together by forming alloys at the interfaces. The clad material in this figure has the side with the thick nickel layer welded to the battery terminal. The thick nickel layer that is welded to the terminal is designed, for example, to be 0.1mm to 0.25mm thick and the thin layer on the opposite side is designed, for example, to be 0.02mm to 0.1mm thick. The center layer of copper is designed, for example, to be 0.1mm to 0.4mm thick. For a lead-tab carrying several tens of amperes of current, a copper thickness of 0.2mm, a thick nickel welding side thickness of 0.2mm, and a thin nickel side thickness of 0.05mm is desirable. The lead-tab 95 made of clad material with the cross-sectional structure of FIG. 9 can be spot-welded to make the center copper layer form alloys. When the lead-tab is spot-welded, heat from the welding fuses the nickel layer to form alloys and weld the copper to the battery terminal.

Figure 10:
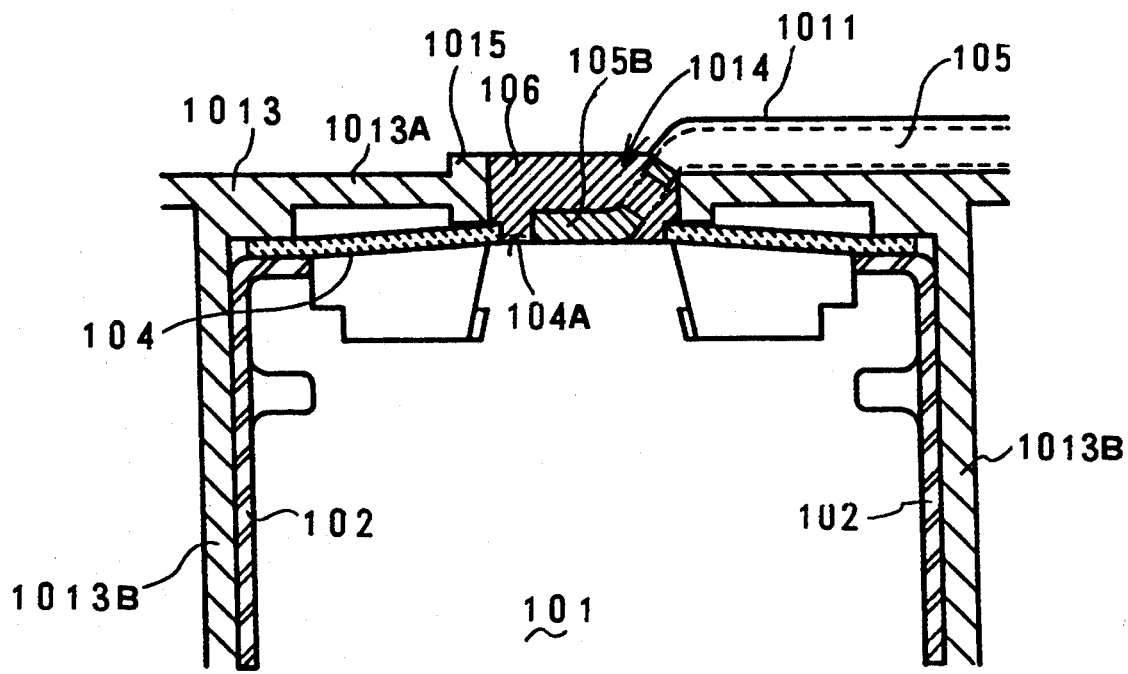
FIG. 10 is an enlarged cross-sectional view of important parts of the +terminal of a battery with the lead-tab shown in FIG. 7.

The lead-tab 75 of FIG. 7 is also provided with adhesive bond insertion holes 712 between the bent portions of the lead-tab ends. The purpose of an adhesive bond insertion hole 712 is for allowing adhesive to be injected to the back side of the lead-tab 75. Without an adhesive bond insertion hole 712, the application of adhesive to the back side of a lead-tab 75 spot-welded to a battery terminal cannot be verified. As shown in FIG. 10, it is necessary to inject adhesive to the back side of the lead-tab 75 without creating voids. This is so that the surface of the lead-tab 105 can be completely covered to shut out air. It is a laborious process to fill the backside of the lead-tab 105 with adhesive without creating voids when an adhesive bond insertion hole is not provided. It is also difficult to determine whether voids have been left. After injected adhesive has filled all voids on the back side of the lead-tab 105 it leaks out from both sides to cover the lead-tab 105. In other words, when adhesive leaks out from the back side of the lead-tab 105, the back side of the lead-tab 105 has been filled without any voids having been left.

The adhesive bond insertion hole 712 is defined between the bends in the lead-tab 75 shown in FIG. 7.

Figure 8:
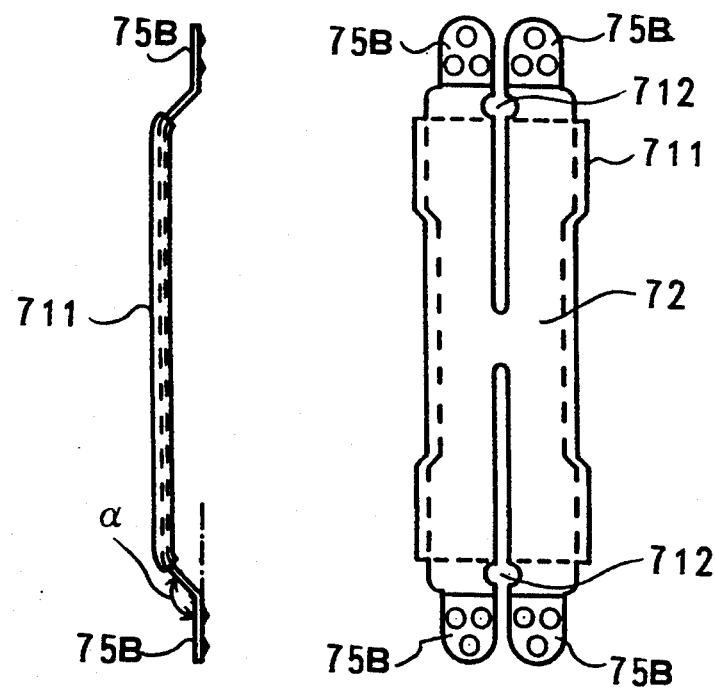
FIG. 8(a) is a side view and FIG. 8(b) is a plan view of a lead tab and tubular covering attached to the lead-tab.

This configuration has the advantage that the strength of the bent portions of the lead-tab 75 is not reduced by the adhesive bond insertion hole 712. The bent portions of the lead-tab 75 are easily damaged by vibration. The strength of the bent portions with respect to vibration is also ensured by making the angle (α) an obtuse angle as shown in FIG. 8. A lead-tab with right angle bends will exhibit large stress concentrations at the bent portions that reduce strength with respect to vibrations. The lead-tab 75 bent at obtuse angles as shown in FIG. 8 has little internal stress and is strong with respect to vibrations.

Further, the lead-tab 75 shown in FIG. 8 is covered by tubular covering 711. The tubular covering 711 covers the central portion of the lead-tab 75. End portions of the lead-tab 75 not covered by tubular covering 711 are covered by adhesive. The entire surface of the lead-tab 75 is covered in a completely moisture-tight fashion by the tubular covering 711 and the adhesive. Although any tubing that shuts out outside air from the lead-tab 75 can be used as the tubular covering 711, heat-shrink tubing is most suitable. The lead-tab 75 is inserted into heat-shrink tubing, then heat is applied to tightly attach the heat-shrink tubing to the surface of the lead-tab 75. The lead-tab 75 shown in FIG. 8 has part of its ends covered but the regions where the adhesive bond insertion holes are located are not covered.

Figure 11:
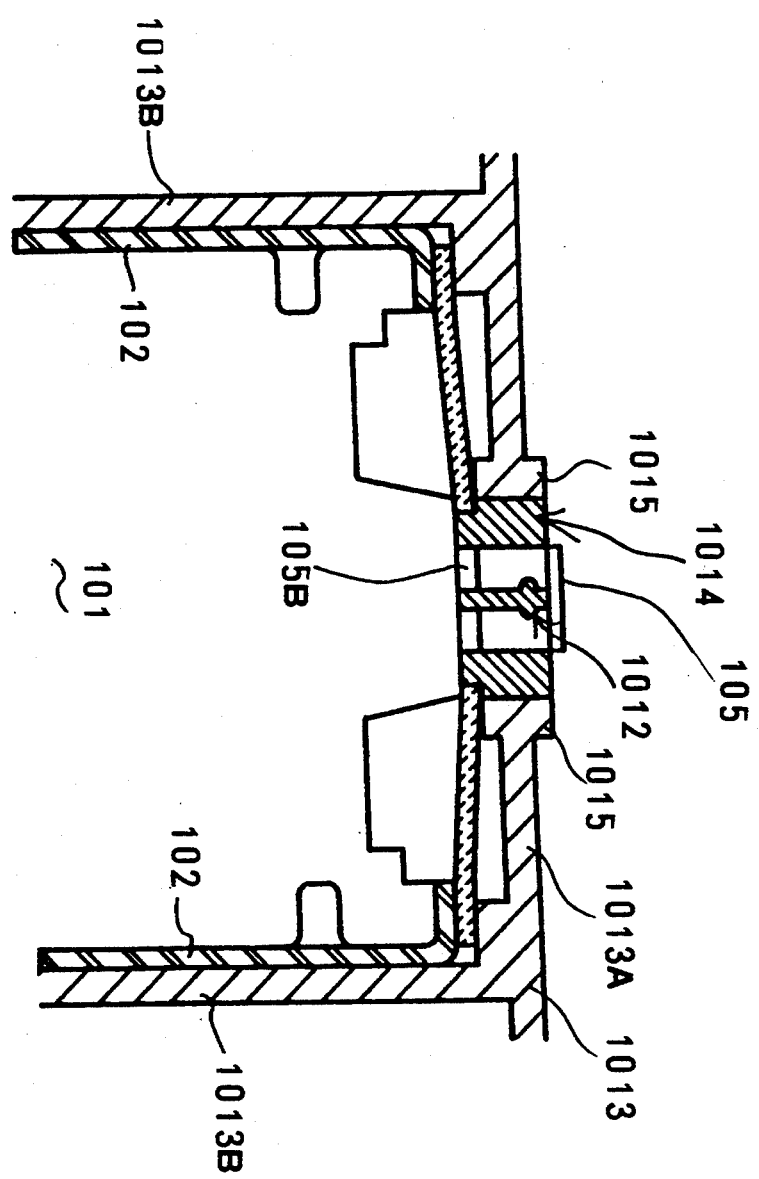
FIG. 11 is a cross-sectional view taken in a plane perpendicular to the plane in which the cross-sectional view of FIG. 10 is taken.
Figure 12:
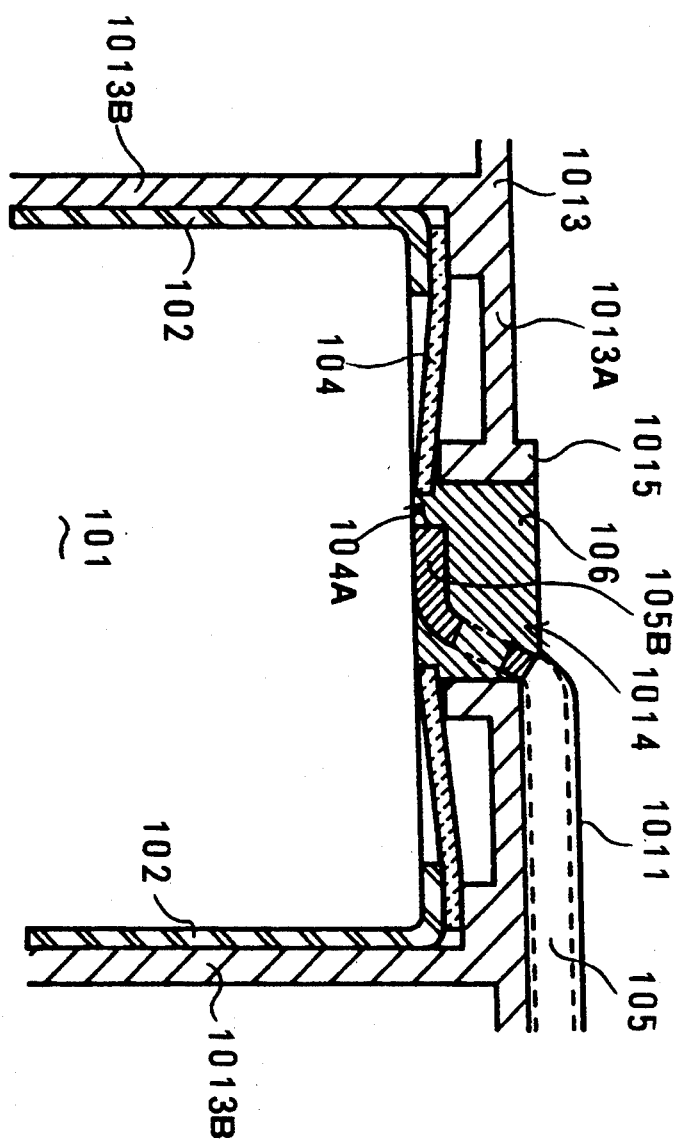
FIG. 12 is an enlarged cross-sectional view of important parts of the −terminal of a battery with the lead-tab shown in FIG. 7.
Figure 13:
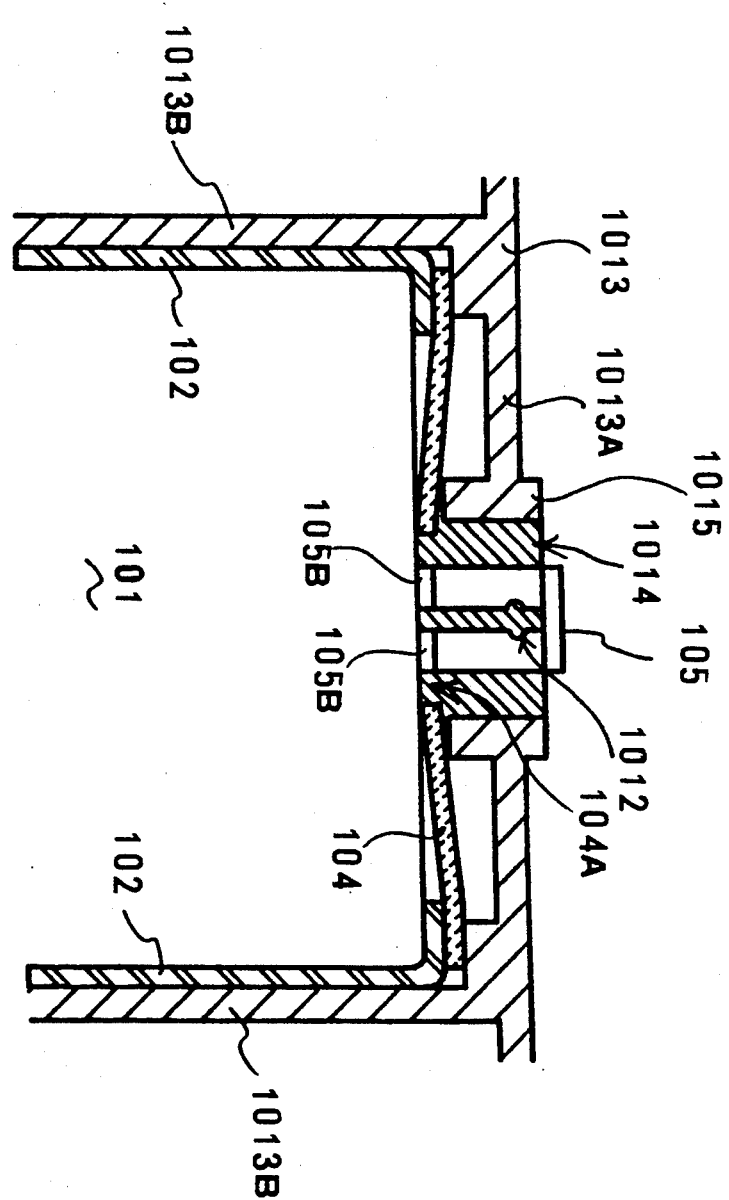
FIG. 13 is a cross-sectional view taken in a plane perpendicular to the plane in which the cross-sectional view of FIG. 12 is taken.
Figure 14:
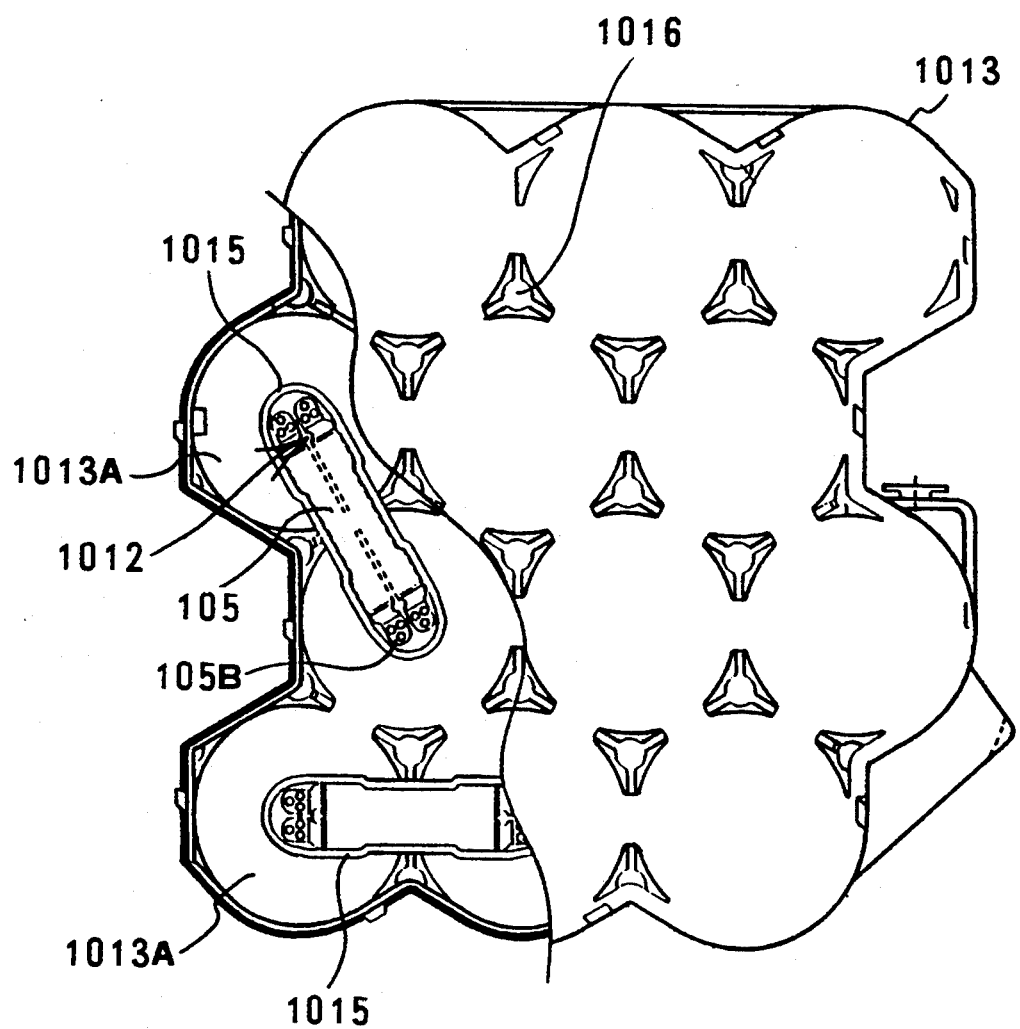
FIG. 14 is a plan view of a casing for the batteries shown in FIGS. 10 through 13.

FIGS. 10 and 11 show the structure of the +terminal region of the battery cell where the lead-tab 75 shown in FIG. 8 is spot-welded, and FIGS. 12 and 13 show the structure of the terminal. In these and other figures, a casing 1013 extends over the sealing plate 104. A plan view of the casing 1013 is shown in FIG. 14. The casing 1013 shown in this figure is of plastic and includes 12 disks 1013A connected in a manner creating openings. The disks 1013A are circular and slightly larger than the outside diameters of the batteries. Cylinders 1013B for receiving battery cells, respectively, are formed under the disks 1013A as one piece therewith. The bases of the cylinders 1013B are open to allow the battery cells to be inserted thereinto.

The centers of the disks 1013A of the casing 1013 define filling holes 1014 filed with adhesive 106. The perimeters of the filling holes 1014 are defined by guide walls 1015. However, the guide walls 1015 are only provided in regions other than underneath the lad-tabs 105. The guide walls 1015 extend to the adhesive bond filling hole 1014 of an adjacent disk 1013A to hold the lead-tab 105 in place. The guide walls 1015 not only facilitate alignment of the lead-tabs 105 but also prevent the lead-tabs 105 from moving out of position.

The casing 1013 has portions at both ends of the battery cells 101 to connect 12 battery cells 101 together in fixed positions. Connecting rods 1016 are formed as a single unit with and are located between the disks 1013A to connect the above-mentioned portions of the casing 1013 together. The cylinders 1013B of the casing 1013 inserted are also thereby connected together.

The bent region of the lead-tab 105 extends through the adhesive bond filling hole 1014 of the casing 1013 and the battery terminal hole 104A of the sealing plate 104, and the welding region 105B is spot-welded to the +terminal of the battery cell. The end of the lead-tab 105 which is not covered by tubular covering 1011 is covered by adhesive 106 occupying both the adhesive bond filling hole 1014 and the battery terminal hole 104A. The adhesive is applied to on the underside of the lead-tab 105 through the adhesive bond insertion hole 1012. The adhesive 106 also covers the upper surface of the lead-tab 105. The adhesive bond filling hole 1014 and the battery terminal hole 104A are filled with the adhesive 106 so that adhesive covers the entire portion of the lead-tab 105 protruding from the tubular covering 1011.

The battery shown in FIG. 1 has both the +and −terminal ends sealed with the same structure, namely the heat-shrink tubing. The +end of this battery is provided with a safety valve. For this reason the −end with no safety valve does not necessarily require the sealing plate to be attached to the heat-shrink tubing via a pressure separating adhesive layer. The sealing late at the −end can be attached to the tubing via adhesive that will not allow separation even if pressure acts on the sealing plate. However, if the sealing plate is attached to both the +and −terminal ends via a pressure separating adhesive layer, the battery can be efficiently manufactured in large quantities because the same structure is used at both ends of the battery.

As described above, by covering each battery cell with heat-shrink tubing, sealing plates, and adhesive, each battery cell has a structure that prevents the ingress of moisture. This allows the battery cell surface to be cooled with outside air, and yet the battery cell is protected against moisture. A battery pack protected against moisture with each individual battery cell in a configuration that allows direct air cooling can be very efficiently cooled compared with prior art battery packs having a plurality of battery cells tightly sealed together within a case. This is because the actual air cooling area per unit battery capacity is substantial, and because the surface of a battery cell can be directly air cooled. The battery pack of this invention, which has a waterproof structure and can be efficiently air cooled, has the feature that it can be discharged or charged with large current while suppressing a temperature rise and preventing performance degradation due to such a temperature rise. Further, since each individual battery has a waterproof structure, corrosion due to the ingress of moisture to the battery cell is drastically reduced.

Still further, the battery having the above-described structure has the feature that even though the battery cell is completely covered in a waterproof manner, internal battery gas can be exhausted when the safety valve opens. The reason for this is as follows. The battery of the present invention has heat-shrink tubing that covers the sidewall of the battery cell and extends over the outer peripheral region of the safety valve terminal end. A sealing plate is attached to the surface of heat-shrink tubing on the outer periphery of the safety valve terminal end via a pressure separating adhesive layer. When the safety valve opens and gas pressure between the battery cell and the sealing plate builds up, the pressure separating adhesive layer fails creating an opening between the sealing plate and the heat-shrink tubing through which gas within the battery terminal can escape. Consequently, the present invention provides a waterproof battery cell that can be effectively air cooled and yet provides no impediment to the operation of the safety valve.

What is claimed is:
1. A battery comprising:
 a battery cell having opposite ends, a battery terminal at one of said ends, a built in safety valve at said one of said ends, and a sidewall extending between said opposite ends;

heat-shrunk tubing covering said sidewall and an outer peripheral region of said one of the ends of the battery cell;

a sealing plate disposed over the portion of the heat-shrunk tubing covering the outer peripheral region of said one of the ends of the battery cell, said sealing plate having a battery terminal hole therethrough open to said battery terminal;

an adhesive layer attaching the sealing plate to the portion of the heat-shrunk tubing covering the outer peripheral region of said one of the ends of the battery cell, said adhesive layer establishing a moisture-tight seal, and said adhesive layer having a design strength which allows the sealing plate to separate from the heat-shrunk tubing when the pressure of gas exhausting through said safety valve reaches a set level;

a lead tab passing through the battery terminal hole of said sealing plate and electrically conductively connected to said battery terminal; and adhesive occupying the battery terminal hole in the space between said lead tab and said sealing plate and establishing a moisture-tight seal thereat.

2. A battery as claimed in claim 1, wherein said adhesive layer is double-sided adhesive tape.

3. A battery as claimed in claim 1, wherein said adhesive layer consists of an adhesive material.

4. A battery as claimed in claim 1, wherein said sealing plate is a plastic plate.

5. A battery as claimed in claim 1, and further comprising a ring attached to said sealing plate and extending around said battery terminal hole.

6. A battery as claimed in claim 1, and further comprising a tubular cover covering a portion of said lead tab such that an end of said lead tab protrudes from said tubular cover, and wherein said end of the lead tab is welded to said battery terminal, said end of the lead tab defines an adhesive bond insertion hole extending through the lead tab adjacent the location at which said end is welded to the battery terminal, and said end of the lead tab that protrudes from said tubular cover is covered by said adhesive.

7. A battery as claimed in claim 1, wherein said lead tab is of a clad material comprising copper and a metal having lower electrical conductivity than copper laminated to the copper.

8. A battery as claimed in claim 7, wherein said metal is nickel.

9. A battery as claimed in claim 1, wherein said lead tab is bent at an obtuse angle at an end thereof connected to said battery terminal.

10. A battery as claimed in claim 9, wherein said end of the lead tab defines an adhesive bond insertion hole extending through the lead tab.

11. A battery as claimed in claim 1, wherein said lead tab has a bifurcated end, and said end of the lead tab is spot-welded to said battery terminal.

12. A battery pack comprising:

a plurality of batteries, each of said batteries including a battery cell having opposite ends, a battery terminal at one of said ends, a built in safety valve at said one of said ends, and a sidewall extending between said opposite ends, heat-shrunk tubing covering said sidewall and an outer peripheral region of said one of the ends of the battery cell, a sealing plate disposed over the portion of the heat-shrunk tubing covering the outer peripheral region of said one of the ends of the battery cell, said sealing plate having a battery terminal hole therethrough open to said battery terminal, an adhesive layer attaching the sealing plate to the portion of the heat-shrunk tubing covering the outer peripheral region of said one of the ends of the battery cell, said adhesive layer establishing a moisture-tight seal, and said adhesive layer having a design strength which allows the sealing plate to separate from the heat-shrunk tubing when the pressure of gas exhausting through said safety valve reaches a set level, a lead tab passing through the battery terminal hole of said sealing plate and electrically conductively connected to said battery terminal, and adhesive occupying the battery terminal hole in the space between said lead tab and said sealing plate and establishing a moisture-tight seal thereat; and a honeycomb core defining a series of tubular passages and securing said batteries to one another, each of said batteries being received in one of said tubular passages of the honeycomb core, and portions of the sidewalls of each of said batteries being spaced from said honeycomb core to define air cooling ducts located between the batteries.

13. A battery pack as claimed in claim 12, wherein said tubular passages have hexagonal cross sections.

14. A battery pack as claimed in claim 12, wherein said honeycomb core is of a flexible and resilient material.

15. A battery pack comprising:

a plurality of batteries, each of said batteries including a battery cell having opposite ends, a battery terminal at one of said ends, a built in safety valve at said one of said ends, and a sidewall extending between said opposite ends, heat-shrunk tubing covering said sidewall and an outer peripheral region of said one of the ends of the battery cell, a sealing plate disposed over the portion of the heat-shrunk tubing covering the outer peripheral region of said one of the ends of the battery cell, said sealing plate having a battery terminal hole therethrough open to said battery terminal, an adhesive layer attaching the sealing plate to the portion of the heat-shrunk tubing covering the outer peripheral region of said one of the ends of the battery cell, said adhesive layer establishing a moisture-tight seal, and said adhesive layer having a design strength which allows the sealing plate to separate from the heat-shrunk tubing when the pressure of gas exhausting through said safety valve reaches a set level, a lead tab passing through the battery terminal hole of said sealing plate and electrically conductively connected to said battery terminal, and adhesive occupying the battery terminal hole in the space between said lead tab and said sealing plate and establishing a moisture-tight seal thereat; and a plastic casing securing said batteries to one another, said casing including a plurality of integral disks each having a diameter larger than that of and covering a respective said one end of a said battery cell, and said plastic casing spacing the sidewalls of said batteries from one another to create gaps therebetween.

16. A battery pack as claimed in claim 15, wherein each of said disks has an adhesive bond filling hole at least at the center thereof, and said casing includes longitudinally extending guide walls surrounding the adhesive bond filling holes of the disks.

17. A battery pack as claimed in claim 15, wherein said casing has a bottom portion located adjacent the other end of each of said battery cells, and connecting rods connecting said disks with said bottom portion, said connecting rods and said disks being of one piece, and said connecting rods extending at locations between said disks.

18. A battery pack as claimed in claim 15, wherein said adhesive of the batteries also occupies the adhesive bond filling holes of said disks.

* * * * *

UNITED STATES PATENT AND TRADEMARK OFFICE
CERTIFICATE OF CORRECTION

PATENT NO. : 5,418,083
DATED : May 23, 1995
INVENTOR(S) : Lemko Tamaki, et. al.

It is certified that error appears in the above-indentified patent and that said Letters Patent is hereby corrected as shown below:

Title page, item [73], Assignee: "Sanyo Electric Co., Ltd. of Osaka, Japan" should be added--.

Signed and Sealed this

Twenty-sixth Day of September, 1995

Attest:

BRUCE LEHMAN

Attesting Officer     Commissioner of Patents and Trademarks